(12) United States Patent
Wimroither et al.

(10) Patent No.: US 7,230,203 B2
(45) Date of Patent: Jun. 12, 2007

(54) PROTECTIVE CAP FOR A CONTACT PIPE IN A WELDING TORCH IN ADDITION TO A WELDING TORCH EQUIPPED WITH SAID CAP

(75) Inventors: Walter Wimroither, Steinbach/Ziehberg (AT); Harald Langeder, Pettenbach (AT); Markus Steinmaurer, Sattledt (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 10/538,313

(22) PCT Filed: Oct. 22, 2003

(86) PCT No.: PCT/AT03/00318

§ 371 (c)(1),
(2), (4) Date: Feb. 23, 2006

(87) PCT Pub. No.: WO2004/052581

PCT Pub. Date: Jun. 24, 2004

(65) Prior Publication Data
US 2006/0255093 A1    Nov. 16, 2006

(30) Foreign Application Priority Data
Dec. 12, 2002    (AT) ............................... A 1859/2002

(51) Int. Cl.
*B23K 10/00*        (2006.01)

(52) U.S. Cl. .............................. 219/121.45; 219/121.5; 219/76.16; 219/76.15; 219/137.44

(58) Field of Classification Search ........... 219/137.61, 219/137.52, 137.44, 76.15, 76.16, 121.47, 219/121.59, 121.45, 121.46
See application file for complete search history.

(56) References Cited

U.S. PATENT DOCUMENTS 4,575,612 A * 3/1986 Prunier .................. 219/137.43

(Continued)

FOREIGN PATENT DOCUMENTS

DE      29 20917 A1    11/1980

(Continued)

*Primary Examiner*—Mark Paschall
(74) *Attorney, Agent, or Firm*—Collard & Roe, P.C.

(57) ABSTRACT

The invention relates to a protective cap for at least one contact pipe of a welding torch, the pipe or pipes having a respective bore for guiding and contacting a respective welding rod that is fed through the pipe or pipes. The cap comprises a housing consisting of or coated with a poor electrically conductive material, for receiving the contact pipe and a bore, which allows the welding rod to emerge. The aim of the invention is to increase the service life of a contact pipe or a welding torch comprising at least one contact pipe of this type. To achieve this, at least two openings are provided in the housing for receiving at least two contact pipes and each opening is connected to one respective bore in the housing for receiving at least two contact pipes and each opening is connected to one respective bore in the housing. Each bore is positioned in such a way that it corresponds with the course of the welding rod in the contact pipe, once the protective cap has been mounted. This permits a welding rod to be fed through the bores of each contact pipe and each bore of the protective cap and to emerge at a welding point.

13 Claims, 5 Drawing Sheets

U.S. PATENT DOCUMENTS

| | | | |
|---|---|---|---|
| 5,192,852 A * | 3/1993 | Pike | 219/137.61 |
| 5,856,647 A | 1/1999 | Luo | |
| 6,245,390 B1 * | 6/2001 | Baranovski et al. | 427/449 |

FOREIGN PATENT DOCUMENTS

| | | |
|---|---|---|
| DE | 44 26 993 C1 | 9/1995 |
| DE | 199 043498 A1 | 8/2000 |
| FR | 2 512 717 A | 3/1983 |
| GB | 999 509 A | 7/1965 |
| GB | 1564 077 A | 4/1980 |
| WO | WO 95/32832 | 12/1995 |
| WO | WO 97 45227 A | 12/1997 |

* cited by examiner

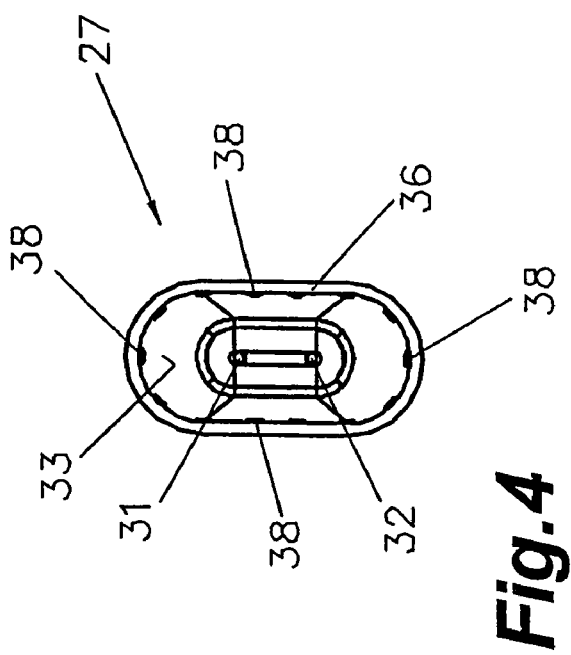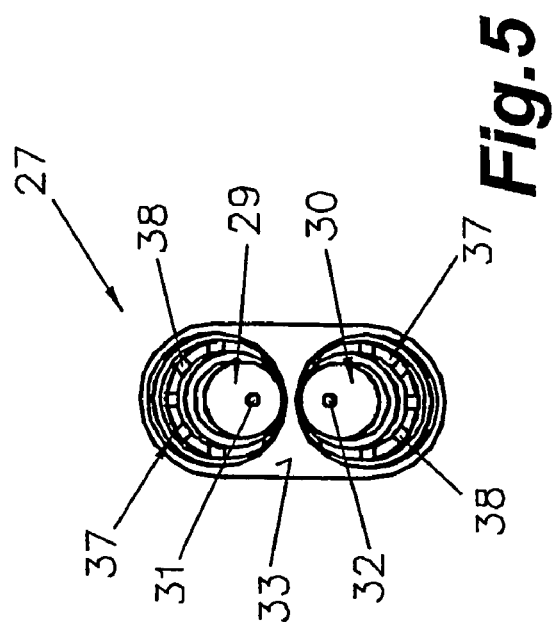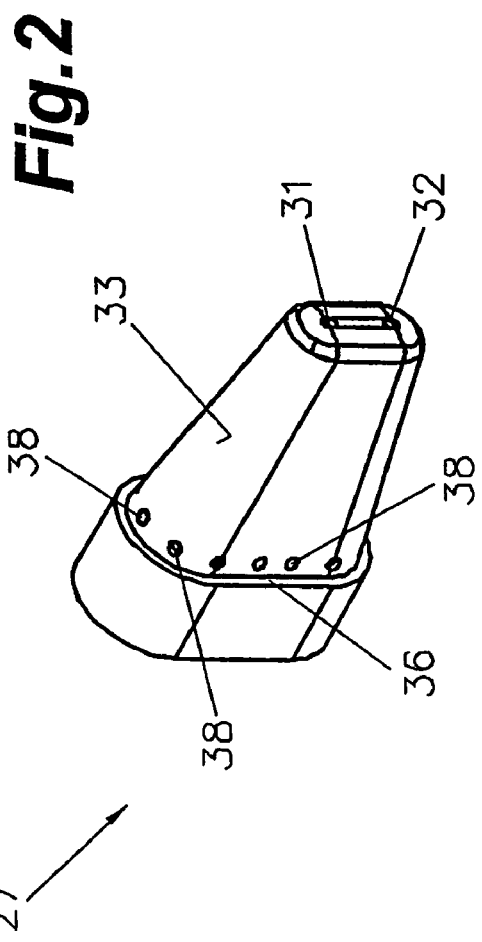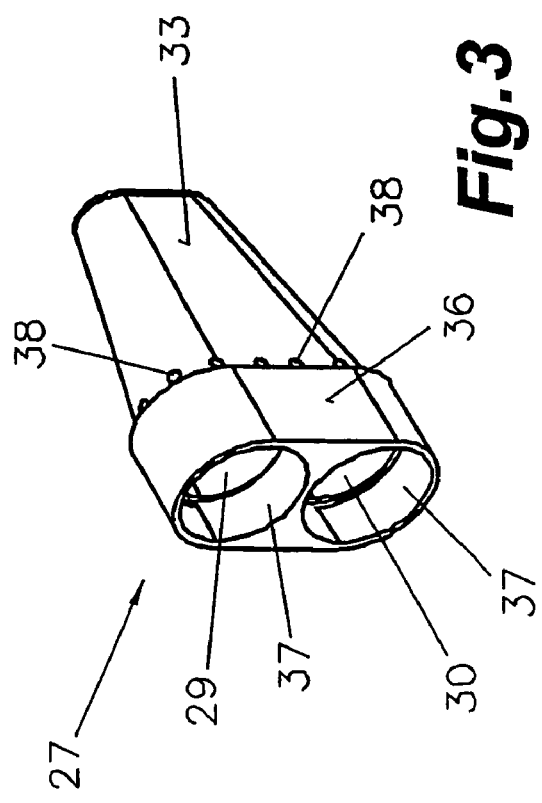

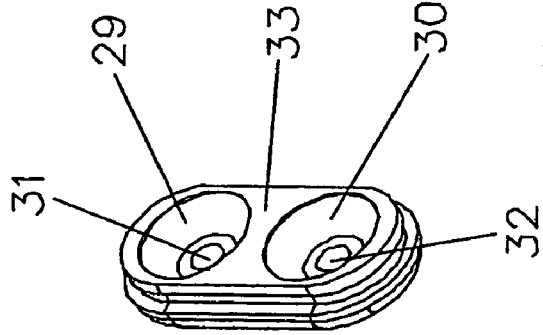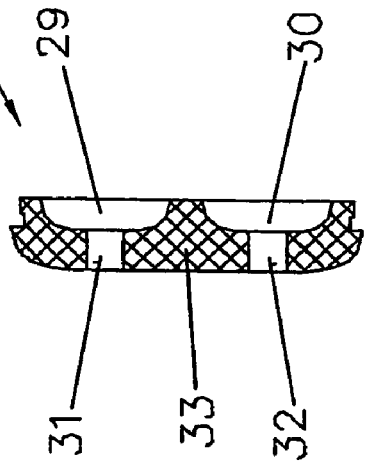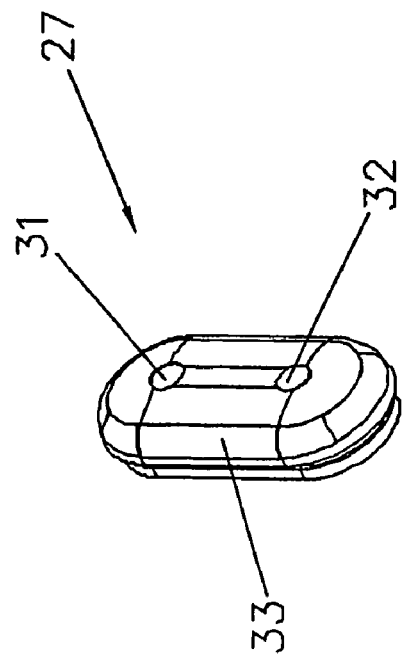

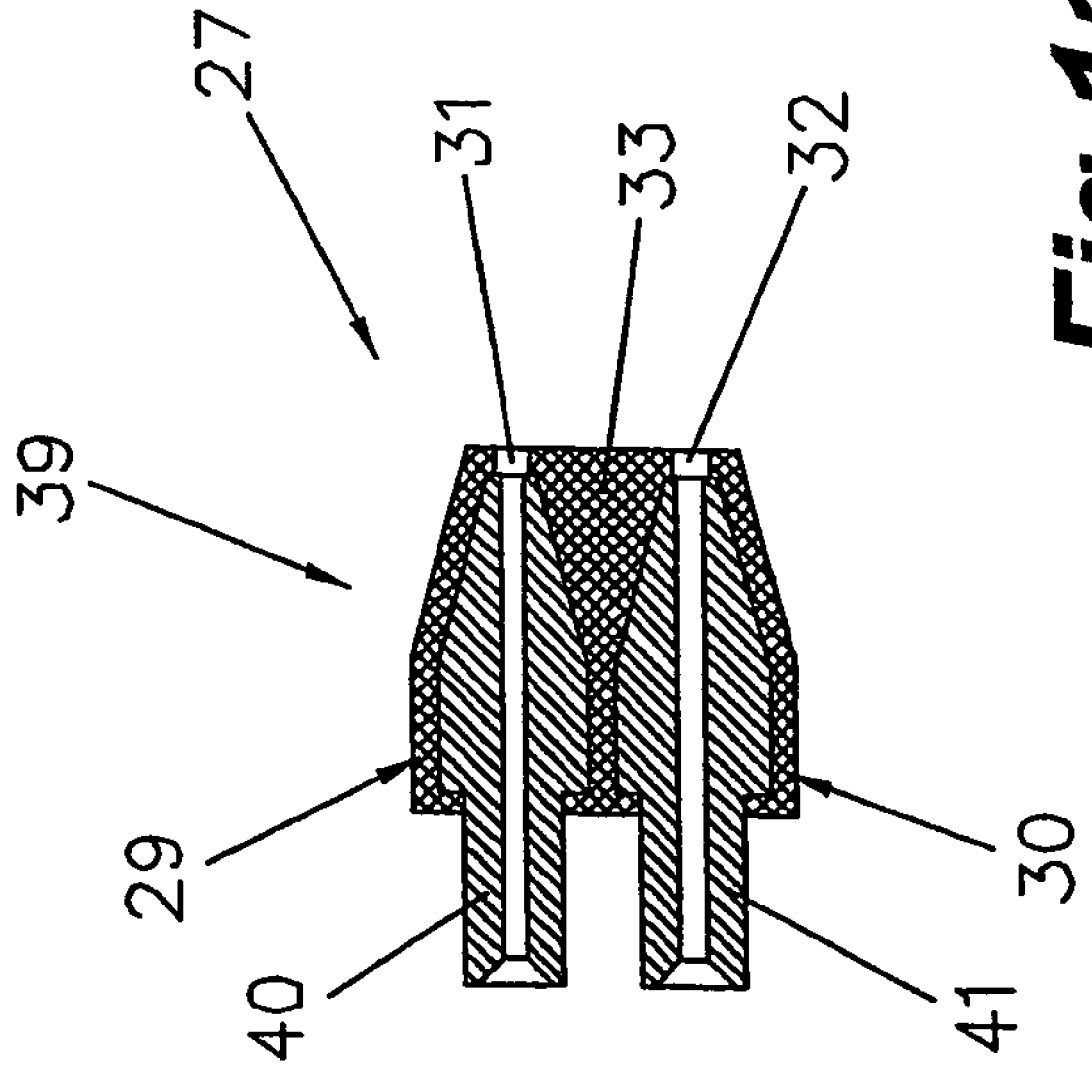

PROTECTIVE CAP FOR A CONTACT PIPE IN A WELDING TORCH IN ADDITION TO A WELDING TORCH EQUIPPED WITH SAID CAP

CROSS REFERENCE TO RELATED APPLICATIONS

Applicants claim priority under 35 U.S.C. §119 of Austrian Application No. A1859/2002 filed Dec. 12, 2002. Applicants also claim priority under 35 U.S.C. §365 of PCT/AT2003/000318 filed Oct. 22, 2003. The international application under PCT Article 21(2) was not published in English.

The invention relates to a protective cap for at least one contact tube of a welding torch each provided with a bore for guiding and contacting a respectively fed welding wire, which protective cap includes a housing made of, or coated with, a poorly electrically conductive material and adapted to receive said contact tube, and a bore provided therein to allow the exit of the welding wire.

The invention further relates to a welding torch comprising at least two contact tubes enclosed by a common gas nozzle, each of said contact tubes including a bore for guiding and contacting a fed welding wire.

The welding technology is confronted with the problem of weld spatters occurring very frequently during welding operations and adhering to the parts arranged next to the weld and, in particular, the contact tube. A plurality of such deposits may, thus, cause short circuits to form between individual components. The problem of adherence of weld spatter is aggravated by the use of electrically well conductive materials such as, for instance, copper or cooper alloys, or brass or brass alloys, which cause the material to heat up on account of the current flow and, hence, the weld spatter to readily adhere to the contact tube.

Said problem occurs especially in two- or multi-wire welding torches, in which different controls and regulations are realized for the individual welding circuits, the weld spatter in those cases depositing between the contact tubes, which are to be located as closely adjacent as possible, and forming short circuits so as to render impossible the separate control and regulation of individual processes.

In order to avoid the adherence of weld spatter, a current contact nozzle and contact tube for an electric arc welding torch are known from DE 199 04 348 A1, wherein at least on the wire exit side one or several different layers of one or several ceramic materials having thicknesses of between 0.1 and 0.7 mm are applied one above the other on the surface of the contact tube, which is roughened there. Those layers are electrically insulating and metal-spatter-repellent. It is, however, disadvantageous that such a coating of the contact tube involves increased manufacturing expenses while the service life of the contact tube is only negligibly extended.

Furthermore, a device for spraying an antiadhesive against weld spatter into the gas nozzle of a welding torch is known from DE 44 26 993 C1. That welding torch comprises an antiadhesive container connected to a spraying nozzle. It is, however, disadvantageous that such a welding torch entails substantially increased structural dimensions, thus rendering impossible any subsequent installation into existing welding torches.

FR 2 512 727 A discloses a contact tube for a single-wire welding torch, which is protected against weld spatter and the high temperatures prevailing on the welding site by a ceramic coating or a ceramic sleeve in order to obtain an extended service life. The coating involves drawbacks because of its high manufacturing costs.

GB 1 564 077 A describes a welding torch in which the contact nozzle is protected by a ceramic sleeve that is open in the direction of the welding site. Such a nozzle is, however, not able to protect the contact nozzle against weld spatter and hence extend its service life. The protective cap according to that document has no bore to allow the exit of the welding wire.

DE 29 20 917 A1 discloses a contact nozzle for protective-gas welding torches, in which a ceramic insulation may be provided between the gas tube and the current-carrying contact nozzle. That insulation sleeve serves to prevent a short circuit between the contact nozzle and the gas tube at a contact of the gas tube with the edges of a welding gap.

U.S. Pat. No. 5,856,647 A describes a plasma welding torch in which a protective cap is arranged to protect the nozzle from weld spatter. The opening provided in the protective cap, which is not intended to guide welding wires in that construction, is relatively large so that weld spatters may reach the interior.

Finally, WO 95/32832 A1 discloses a contact nozzle for a welding torch, the front tip of which is made of a higher-resistance material. The tip of the contact nozzles is fixed via screw connections. With two-wire or multi-wire welding torches having two or more contact nozzles, it would, thus, be impossible to prevent a short circuit between the contact nozzles due to adhering weld spatter. In addition, the structure according to WO 95/32832 A1 requires a special construction of the contact tube, thus rendering impossible the use of commercially available contact tubes.

It is the object of the present invention to substantially increase the service lives of a contact tube and a welding torch equipped with at least one such contact tube.

The object according to the invention is achieved by a protective cap of the above-defined type, wherein at least two openings for receiving at least two contact tubes are provided in the housing and each opening is connected with a respective bore provided in the housing, wherein each bore is arranged in a manner corresponding with the course of the welding wire within the contact tube in the installed state of the protective cap, so as to enable a respectively fed welding wire to exit to a welding site through the bore of each contact tube and each bore of the protective cap. By using such a protective cap for two-wire or multi-wire welding torches having two or more contact tubes, these can be completely covered relative to the welding site, and the adherence of weld spatter can, thus, be prevented. This results in a substantial increase in the service life of such a two-wire or multi-wire welding torch. Another essential advantage consists in that the use of a protective cap of this type renders feasible the use of commercially available contact tubes without any adaptation work, and the costs for this wear part can, thus, be kept very low. Expensive coating of the contact tubes, for instance with a ceramic layer, is no longer necessary. In addition to avoiding weld spatter on the tip of the contact nozzle, the present protective cap will effectively prevent short circuits between the contact nozzles in two-wire or multi-wire welding torches. The respective arrangement of the bores in the housing of the protective cap for the welding wires safeguards the friction-free conveyance of the welding wire throughout the welding process. The present protective cap, thus, constitutes a cost-effective option to effectively protect contact tubes in two-wire or multi-wire welding torches and, hence, extend the service life of the welding torch.

In an advantageous manner, the housing of the protective cap is made of a material exhibiting a low tendency to metal spatter adherence and, in particular, weld spatter adherence. If weld spatters do adhere nevertheless, this will not substantially affect the welding process since the material of the protective cap is poorly electrically conductive or non-conductive and, hence, no short circuits will occur between the contact nozzle and the gas nozzle, or between contact nozzles.

Similarly, the housing of the protective cap may be coated with a material having a low tendency to metal spatter adherence and, in particular, weld spatter adherence.

In doing so, ceramics is particularly suitable as a material for the housing, or the coating of the housing, of the protective cap.

In an advantageous manner, fastening elements are arranged on an outer surface of the housing to enable the establishment of a clamping or screwing connection with a gas nozzle of the welding torch. This allows for rapid mounting and dismounting of the protective cap on the at least one contact tube, and on the gas nozzle of the welding torch, respectively.

The fastening elements may be comprised of at least one web via which the protective cap is connectible with the gas nozzle in a manner that the protective cap is held as the gas nozzle is being slipped on, or fastened to, the welding torch. This constitutes a simple and effective option of realizing said fastening elements.

Furthermore, at least one further opening may be provided in the housing of the protective cap for receiving further elements of the welding torch and, in particular, for receiving a partial region of a torch body with the at least one contact tube fastened therein, thus enabling all conductive elements of the welding torch to be covered by the protective cap in the region of the gas nozzle, i.e., on the end of the torch body.

In an advantageous manner, bores are provided on the housing of the protective cap to allow a gas fed by the welding torch to exit into the region between the gas nozzle and the protective cap. These bores can be provided for the most different welding torches, preferably in a manner corresponding with the gas outlet openings provided on the welding torch.

According to another characteristic feature of the invention, the bores are provided on the housing in a radially peripheral manner.

The protective cap may also be configured in a manner that at least one contact tube is integrated in the housing so as to form a so-called sandwich component.

In doing so, at least one contact tube may be integrated or embedded in the housing of the protective cap over a partial region.

The integrated contact tubes are preferably made of an electrically conductive material, particularly copper or a copper alloy, in order to provide an electric connection to the welding wire.

The object according to the invention is also achieved by a welding torch of the above-mentioned type, wherein an above-described protective cap is placed over at least a partial region of the contact tubes.

In a preferred manner, at least one opening for receiving the contact tubes and bores communicating with said at least one opening are provided in the housing of the protective cap, said bores, with the contact tubes arranged within the protective cap, extending in alignment or correspondence with the bores of the contact tubes so as to allow the fed welding wires to exit to a welding site through the bores in the contact tubes and the bores of the protective cap. With a two-wire or multi-wire welding torch of this type, the service life will be substantially extended by such a configuration of the protective cap.

The contact tubes in this case are preferably made of an electrically conductive material, particularly copper or a copper alloy, in order to provide an electric connection to the welding wires.

The present invention will be explained in more detail by way of the accompanying drawings, which illustrate exemplary embodiments of the invention.

Therein:

FIG. 2 is a perspective view of a protective cap in a simplified, schematic illustration;

FIG. 3 is a further perspective view of the protective cap according to FIG. 2;

FIG. 4 is a front view of the protective cap according to FIG. 2;

FIG. 5 is a rear view of the protective cap according to FIG. 2;

FIG. 8 is a perspective view of a further exemplary embodiment of a protective cap in a simplified, schematic illustration;

FIG. 9 is a further perspective view of the protective cap according to FIG. 8;

FIG. 10 is a sectional side view of the protective cap according to FIG. 8; and FIG. 11 is a sectional, schematic side view of a further exemplary embodiment of a protective cap having integrated contact tubes.

FIG. 1 depicts a welding apparatus 1, or welding installation, to be used in various welding methods such as, e.g., MIG/MAG welding or WIG/TIG welding, or electrode welding methods, double-wire/tandem welding methods, plasma or soldering methods etc. It goes without saying the the solution according to the invention may be used with a power source or a welding power source.

Figure 1:
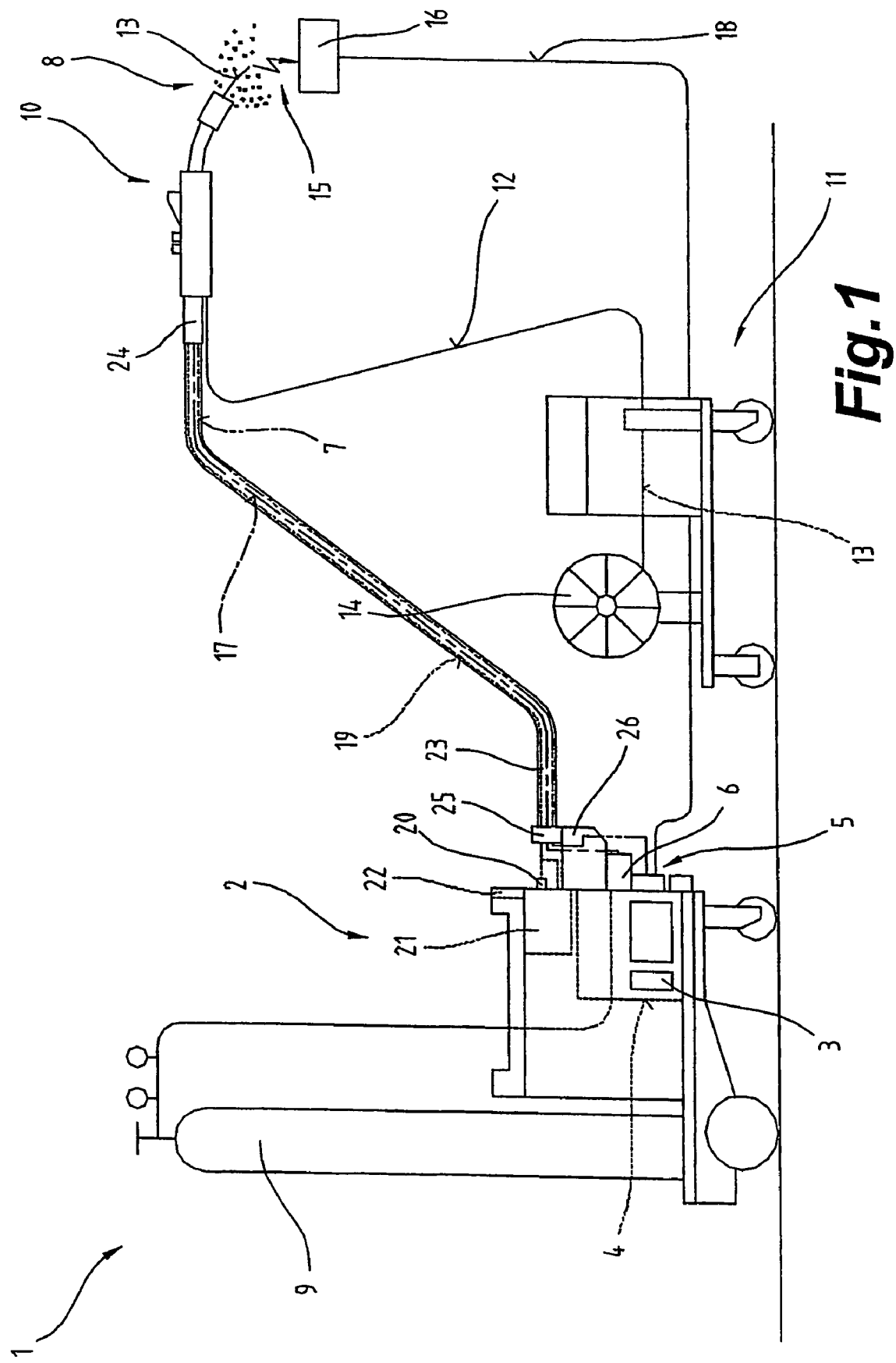
FIG. 1 is a schematic illustration of a welding machine or welding apparatus.

The welding apparatus 1 comprises a power source 2 including a power element 3, a control device 4, and a switch member 5 allocated to the power element 3 and the control device 4, respectively. The switch member 5 and the control device 4 are connected to a control valve 6 arranged in a feed line 7 for a gas 8 and, in particular, a protective gas such as, for instance, carbon dioxide, helium, argon or the like, between a gas reservoir 9 and a welding torch 10.

In addition, a wire feeder 11, which is usually employed in MIG/MAG welding, can also be activated by the control device 4, an additional material or welding wire 13 being fed from a feed drum 14 into the region of the welding torch 10 via a feed line 12. It is, of course, possible to integrate the wire feeder 11 in the welding apparatus 1 and, in particular, its basic housing as is known from the prior art, rather than designing the same as an accessory device as illustrated in FIG. 1.

It is also feasible for the wire feeder 11 to supply the welding wire 13, or additional material, to the process site or welding site outside the welding torch 10, to which end a non-consumable electrode is preferably arranged within the welding torch 10, as is usually the case with WIG/TIG welding.

The power for building up an electric arc 15 between the consumable electrode, or welding wire 13, and a workpiece 16 is supplied from the power element 3 of the power source 2 to the welding torch 10 via a welding line 17, wherein the workpiece 16 to be welded, which is formed of several parts, is likewise connected with the welding apparatus 1 and, in particular, the power source 2 via a further welding line 18, thus enabling a power circuit to build up over the electric arc 15, or over the plasma jet formed, for a process to take place on the welding site.

To provide cooling of the welding torch 10, the welding torch 10 can be connected to a fluid reservoir 21, particularly a water reservoir, by a cooling circuit 19 via an interposed flow control 20, whereby the cooling circuit 19 and, in particular, a fluid pump used for a fluid contained in the water reservoir 21, is started as the welding torch 10 is put into operation, so as to effect cooling of the welding torch 10.

The welding apparatus 1 further comprises an input and/or output device 22, via which the different welding parameters, operating modes or welding programs of the welding apparatus 1 can be set and called, respectively. In doing so, the welding parameters, operating modes or welding programs set by the input and/or output device 22 are transmitted to the control device 4, which, in turn, will subsequently activate the respective components of the welding apparatus 1.

Furthermore, the welding torch 10 in the exemplary embodiment illustrated is connected with the welding apparatus 1 or welding installation via a hose package 23. The hose package 23 accommodates the individual lines from the welding apparatus 1 to the welding torch 10. The hose package 23 is connected with the welding torch 10 via a coupling device 24, whereas the individual lines arranged in the hose package 23 are connected with the respective connections of the welding apparatus 1 via connection sockets or plug-in connections. In order to ensure the appropriate strain relief of the hose package 23, the hose package 23 is connected with a housing 26 of the welding apparatus 1 via a strain relief means 25. It is, of course, also possible to use the coupling device 24 for the connection to the welding apparatus 1.

Basically, it is to be noted that not all of the previously mentioned components need be used or employed with the various welding methods or welding apparatus 1, such as, e.g., WIG devices or MIG/MAG apparatus or plasma devices. If, for instance, a multi-wire welding process and, in particular, a double-wire welding process is carried out, an additional welding apparatus 1 is preferably used, wherein the two welding apparatus 1 will then be connected to a common welding torch 10, as is known from the prior art. To this end, the two welding apparatus 1 are connected via control lines so as to allow for the appropriate synchronization of the two welding apparatus 1. It is, of course, possible to us but a single welding apparatus 1, wherein the latter will then be configured so as to allow two or more independent power circuits to build up in order to obtain an independent control and regulation of the individual welding processes.

FIGS. 2 to 5 depict an embodiment of a protective cap 27 to be inserted in a welding torch 10 having at least two contact tubes 40, 41 (cf. FIG. 11). The contact tubes 40, 41 are enclosed by a common gas nozzle 28 and each comprise a bore for guiding and contacting a supplied welding wire 13. The contact tube 40, 41, which provides current transfer to the welding wire 13, is preferably made of electrically conductive material, particularly copper or a copper alloy, or is equipped with appropriate contact means. The protective cap 27 is slipped on or placed over the contact tubes 40, 41, or over a partial region of the contact tubes 40, 41. To this end, the protective cap 27 includes two openings 29, 30 for receiving the contact tubes 40, 41. Furthermore, bores 31, 32 communicating with openings 29, 30, respectively, for receiving the contact tubes 40, 41 are provided in the protective cap 27. The bores 31, 32 are arranged in the protective cap 27, or in a housing 33 of the protective cap 27, in a manner so as to extend in alignment or correspondence with the bores of the contact tubes 40, 41 with the contact tubes 40, 41 inserted, so that a fed welding wire 13 is able to exit at a welding site via the bores provided in the contact tubes 40, 41 and the bores 31, 32 provided in the protective cap 27. In a preferred manner, the protective cap 27 when used in a multi-wire welding torch and, in particular, a double-wire welding torch 10 is designed such that a separate opening 29, 30 and bore 31, 32 are each arranged for every contact tube to be received. This ensures more precise positioning for the aligned transition between the bore of the contact tube and the bore 31, 32 of the protective cap 27 in order to safeguard the friction-free conveyance of wires.

Figure 7:
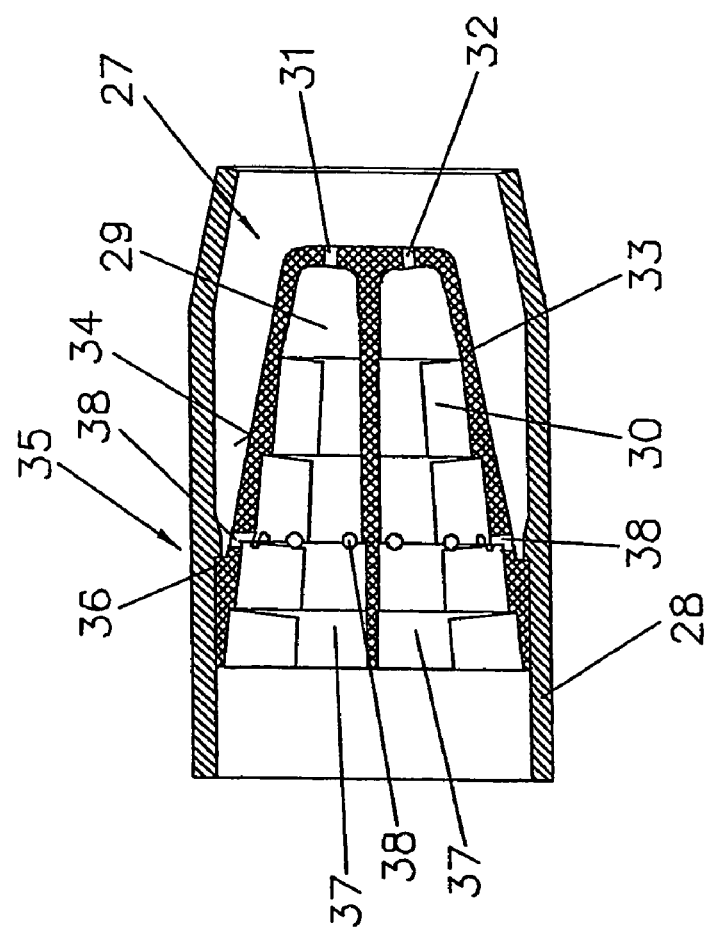
FIG. 7 is a sectional illustration of the protective cap according to FIG. 6 arranged in the gas nozzle.
Figure 6:
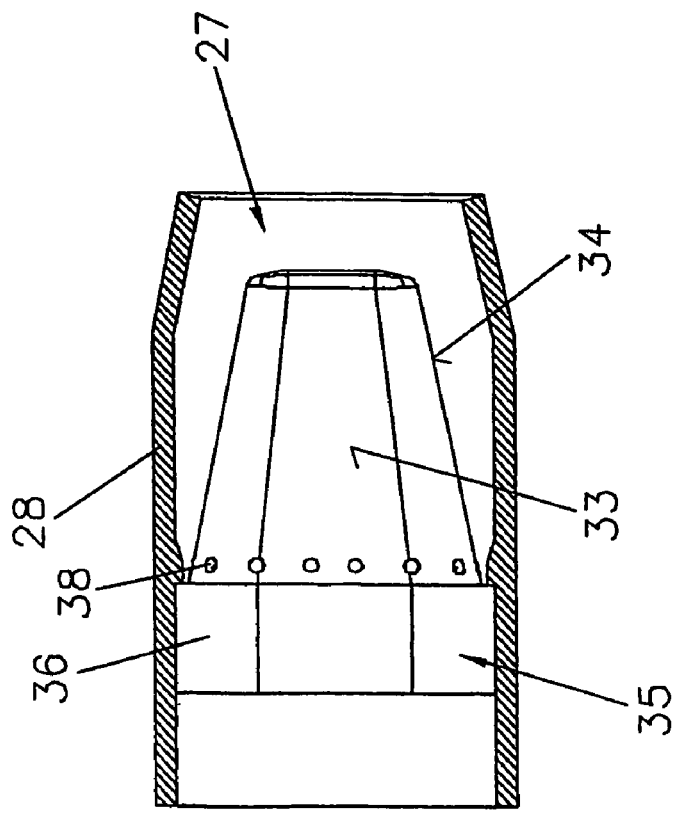
FIG. 6 is a partially sectioned side view of the protective cap according to FIG. 2 arranged in a gas nozzle.

The protective cap 27 and, in particular, the housing 33 of the protective cap 27 is made of a poorly electrically conductive material having poor metal spatter adherence properties and, in particular, weld spatter adherence properties. The housing 33 is preferably made of ceramics or ceramic-coated materials. Due to the use of an electrically non-conductive material, it has become feasible to slip the protective cap 27 over several contact tubes 40, 41 without the protective cap 27 causing a short circuit between the individual contact tubes 40, 41. By fully closing the contact tubes 40, 41 with the protective cap 27 in the end region, i.e., in the region of the welding site, it is, moreover, ensured in an advantageous manner that, at the same time, also the spaces between the individual contact tubes 40, 41 are covered so as to prevent the build-up of weld spatter in those spaces. If a contact tube 40, 41 having a coated ceramic surface as known from the prior art were, in fact, used, weld spatter would be able to collect between the contact tubes 40, 41 and, hence, lead to a short circuit, if such contact tubes 40, 41 were applied in a multi-wire or double-wire welding torch. Furthermore, fastening elements 35 may be arranged on an outer surface 34 of the housing 33 of the protective cap 27 to establish a clamping or screwing connection with the gas nozzle 28. The fastening elements 35 may, for instance, be comprised of at least one web 36 via which the protective cap 27 is connected with the gas nozzle 28 and held as the gas nozzle 28 is slipped on, and fastened to, the welding torch 10. This is schematically illustrated in FIGS. 6 and 7. The protective cap 27 may, of course, be fastened to the welding torch 10 in the most diverse ways.

The protective cap 27 may comprise a further opening 37 to receive further elements of the welding torch 10 and, in particular, a partial region of a torch body (not illustrated) with the contact tubes fastened therein. Thus, all of the conductive elements of the welding torch 10 will be covered by the protective cap 27 in the region of the gas nozzle 28, i.e., at the end of the torch body. The protective cap 27 is, thus, slipped over all electrically conductive parts of the welding torch 10 such that no short circuit will ever occur between an electrically conductive part of the welding torch 10 and the gas nozzle 28 due to weld spatters possibly adhering within the gas nozzle 28. Such a configuration of the protective cap 27 will require further bores 38 to be arranged on the protective cap 27 in order to allow the gas 8 supplied by the welding torch 10 to exit the interior of the gas nozzle 28. For the most different welding torches 10, these bores 38 may be arranged in the housing 33 of the protective cap 27 so as to appropriately correspond with the gas outlet openings provided on the welding torch 10. In the exemplary embodiment illustrated, radially peripheral bores 38 are provided on the housing 33, via which the gas 8 supplied by the welding torch 10 is able to emerge in the region between the gas nozzle 28 and the protective cap 27.

In FIGS. 8 to 10, another exemplary embodiment of a protective cap 27 is shown. As in contrast to the variant embodiment according to FIGS. 2 to 7, the protective cap 27 does no longer cover all of the contact tubes 40, 41, but is only arranged in the end region of the contact tubes 40, 41, i.e., in the region towards the welding site. The protective cap 27, thus, provides coverage to the ends of the contact tubes 40, 41.

In accordance with the embodiment according to FIG. 11, it is also feasible for the protective cap 27 and the contact tubes 40, 41 to form a common sandwich component 39. For the manufacture of the protective cap 27, commercial contact tubes 40, 41 are embedded in the ceramic housing or ceramic-coated housing 33 of the protective cap 27. The protective cap 27 with its integrated contact tubes 40, 41 is subsequently inserted in the welding torch 10, or fastened to the same, so as to establish an electric connection with the contact tubes 40, 41. Such a configuration enables the protective cap 27 and the contact tubes 40, 41 to be fixed or removed in a single operation. A very rapid and simple exchange will, thus, be feasible. The basic difference of the sandwich construction according to FIG. 11 from that of the prior art consists in that commercially available contact tubes 40, 41 may be employed without any adaptation work, merely by being embedded into the protective cap 27 during the manufacture of the same. By contrast, known constructions involve complex coating procedures for applying ceramic layers on the contact tubes 40, 41, which results in extremely high production costs. On the other hand, production costs with sandwich components 39 according to FIG. 11 can be kept very low.

It goes without saying that the shown exemplary embodiments of the protective cap 27 are not limited to the shapes illustrated, but may be devised in any desired manner. Another configuration of the protective cap 27 comprising at least two contact tubes 40, 41 might also be realized by making the protective cap 27 of several parts, particularly two parts, with the openings 29, 30 for the contact tubes 40, 41 being again provided in the housing 33. In this case, the contact tubes 40, 41 are inserted into a first part of the protective cap 27, on which a second part of the protective cap 27 is subsequently placed such that the contact tubes 40, 41 will be completely integrated in the interior of the protective cap 27. In a preferred manner, an end region of the contact tubes 40, 42 will then project out of the protective cap 27 so as to enable the contact tubes 40, 41 to be fastened to the welding torch 10 in order to provide an appropriate electric connection from the welding torch 10 to the contact tubes 40, 41. In this manner, the protective cap 27 can be directly fastened to the contact tubes 40, 41 so as to enable a simple exchange of the contact tubes 40, 41 in case of wear.

If, on the other hand, the contact tubes 40, 41 are completely integrated in the protective cap 27, the provision of a power supply for the contact tubes 40, 41 will be required. Thus, contact elements may, for instance, be integrated in the protective cap 27 to establish an electric connection to the contact tubes 40, 41, on the one hand, and to the welding torch 10, on the other hand (not illustrated).

The invention claimed is:

1. A protective cap for at least one contact tube (40,41) of a welding torch (10) each provided with a bore for guiding and contacting a respectively fed welding wire, which protective cap includes a housing (33) made of, or coated with, a poorly electrically conductive material and adapted to receive said contact tube (40, 41), and a bore (31, 32) provided therein to allow the exit of the welding wire (13), wherein at least one opening (29, 30) for receiving at least one contact tube (40, 41) is provided in the housing (33) and each opening (29, 30) is connected with a respective bore (31, 32) provided in the housing (33), and each bore (31, 32) is arranged in a manner corresponding with the course of the welding wire (13) within the contact tube (40, 41) in the installed state of the protective cap (27), so as to enable a respectively fed welding wire (13) to exit to a welding site through the bore of each contact tube (40, 41) and each bore (31, 32) of the protective cap (27), wherein at least two openings (29, 30) for receiving at least two contact tubes (40, 41) fastened therein are provided in the housing (33), and that fastening elements (35) are arranged on an outer surface (34) of the housing (33) to enable the establishment of a connection with a gas nozzle (28) of the welding torch (10), thus causing all conductive elements of the welding torch (10) to be covered by the protective cap (27) in the region of the gas nozzle (28) and wherein bores (38) are provided on the housing (33) to allow a gas (8) fed by the welding torch (10) to exit into the region between the gas nozzle (28) and the protective cap (27).

2. A protective cap according to claim 1, wherein the housing (33) of the protective cap (27) is made of a material exhibiting a low tendency to metal spatter adherence.

3. A protective cap according to claim 1, wherein the housing (33) of the protective cap (27) is coated with a material exhibiting a low tendency to metal spatter adherence.

4. A protective cap according to claim 1, wherein the housing (33) of the protective cap (27) is made of ceramics.

5. A protective cap according to claim 1, wherein the connection of the protective cap (27) with the gas nozzle (28) is formed by a clamping or screwing connection.

6. A protective cap according to claim 1, wherein the fastening elements (35) are comprised of at least one web (36) via which the protective cap (27) is connectible with the gas nozzle (28) in a manner that the protective cap (27) is held as the gas nozzle (28) is slipped on, or fastened to, the welding torch (10).

7. A protective cap according to claim 1, wherein said bores are provided on the housing (33) in a radially peripheral manner.

8. A protective cap according to claim 1, wherein at least one contact tube (40, 41) is integrated in the housing (33) so as to form a sandwich component (39).

9. A protective cap according to claim 8, wherein at least one contact tube (40, 41) is embedded in the housing (33) over a partial region.

10. A protective cap according to claim 8, wherein the contact tubes (40, 41) are made of an electrically conductive material, particularly copper or a copper alloy, thus providing current transfer to the welding wire (13).

11. A welding torch including at least two contact tubes (40, 41) enclosed by a common gas nozzle (28), wherein each contact tube (40, 41) has a bore (31, 32) for guiding and contacting a respectively fed welding wire (13), and wherein a protective cap (27) according to claim 1 is placed over the contact tubes (40, 41).

12. A welding torch according to claim 11, wherein the contact tubes (40, 41) are made of an electrically conductive material, thus providing current transfer to the welding wires (13).

13. A welding torch according to claim 12, wherein the contact tubes (40, 41) are made of copper or a copper alloy.

* * * * *